United States Patent
Feather

(10) Patent No.: US 7,391,748 B2
(45) Date of Patent: Jun. 24, 2008

(54) CONFIGURATION OF ENTERPRISE GATEWAYS

(75) Inventor: Arthur E. Feather, Monte Sereno, CA (US)

(73) Assignee: Cisco Technology, Inc., San Jose, CA (US)

( * ) Notice: Subject to any disclaimer, the term of this patent is extended or adjusted under 35 U.S.C. 154(b) by 1065 days.

(21) Appl. No.: 10/272,353

(22) Filed: Oct. 15, 2002

(65) Prior Publication Data

US 2004/0081173 A1    Apr. 29, 2004

(51) Int. Cl.
*H04Q 7/00*  (2006.01)

(52) U.S. Cl. ............... 370/328; 370/392; 370/395.2; 370/401; 455/433; 455/435.1

(58) Field of Classification Search ........... 370/225, 370/238, 392, 401, 328, 338, 389, 395.2, 370/395.21; 455/433, 435.1
See application file for complete search history.

(56) References Cited

U.S. PATENT DOCUMENTS

| 5,852,630 | A  | * | 12/1998 | Langberg et al. | ......... 375/219 |
| 6,469,998 | B1 |   | 10/2002 | Salinas et al. | ............ 370/338 |
| 6,501,741 | B1 | * | 12/2002 | Mikkonen et al. | ........ 370/310 |
| 6,545,992 | B2 |   | 4/2003  | Naqvi et al. | ............. 370/335 |
| 6,553,219 | B1 |   | 4/2003  | Vilander et al. | ........... 455/411 |
| 6,567,667 | B1 | * | 5/2003  | Gupta et al. | .............. 455/445 |
| 6,608,832 | B2 | * | 8/2003  | Forslow | ................... 370/353 |
| 6,636,502 | B1 | * | 10/2003 | Lager et al. | ............... 370/352 |
| 6,937,566 | B1 | * | 8/2005  | Forslow | ................... 370/231 |
| 6,959,009 | B2 | * | 10/2005 | Asokan et al. | ............ 370/475 |
| 6,973,076 | B2 | * | 12/2005 | Takeda et al. | ............ 370/356 |
| 6,980,801 | B1 | * | 12/2005 | Soininen et al. | ........ 455/435.1 |
| 7,127,489 | B2 | * | 10/2006 | Aho | ........................ 709/206 |
| 7,154,891 | B1 | * | 12/2006 | Callon | ................... 370/392 |
| 7,161,942 | B2 | * | 1/2007  | Chen et al. | ............... 370/392 |
| 7,184,418 | B1 | * | 2/2007  | Baba et al. | ............... 370/331 |
| 7,292,575 | B2 | * | 11/2007 | Lemieux et al. | .......... 370/392 |
| 2002/0013848 | A1 |   | 1/2002 | Rene Salle | .............. 709/226 |
| 2002/0136210 | A1 |   | 9/2002 | Boden et al. | ............. 370/389 |

FOREIGN PATENT DOCUMENTS

EP          0483547 A1     10/1991

OTHER PUBLICATIONS

PCT Notification of Transmittal of the International Search Report or the Declaration mailed Apr. 8, 2004, re PCT/US 03/32839 filed Oct. 15, 2003 (6 pages).

* cited by examiner

*Primary Examiner*—Hassan Kizou
*Assistant Examiner*—Brian T O'Connor
(74) *Attorney, Agent, or Firm*—Baker Botts L.L.P.

(57) ABSTRACT

A method for configuring enterprise gateways includes determining an enterprise internet protocol (IP) address that identifies the interface of an enterprise gateway. The interface couples to one or more components of an enterprise network. An enterprise domain name associated with the enterprise network is determined. An address for a border gateway within an operator network is determined. The operator network links the enterprise gateway to the one or more mobile nodes. A configuration request is communicated to the border gateway. The configuration request includes the enterprise domain name. Operator configuration information is received from the border gateway. The operator configuration information includes an access point name assigned to the enterprise network and for use by the mobile nodes to request access to the enterprise network.

33 Claims, 3 Drawing Sheets

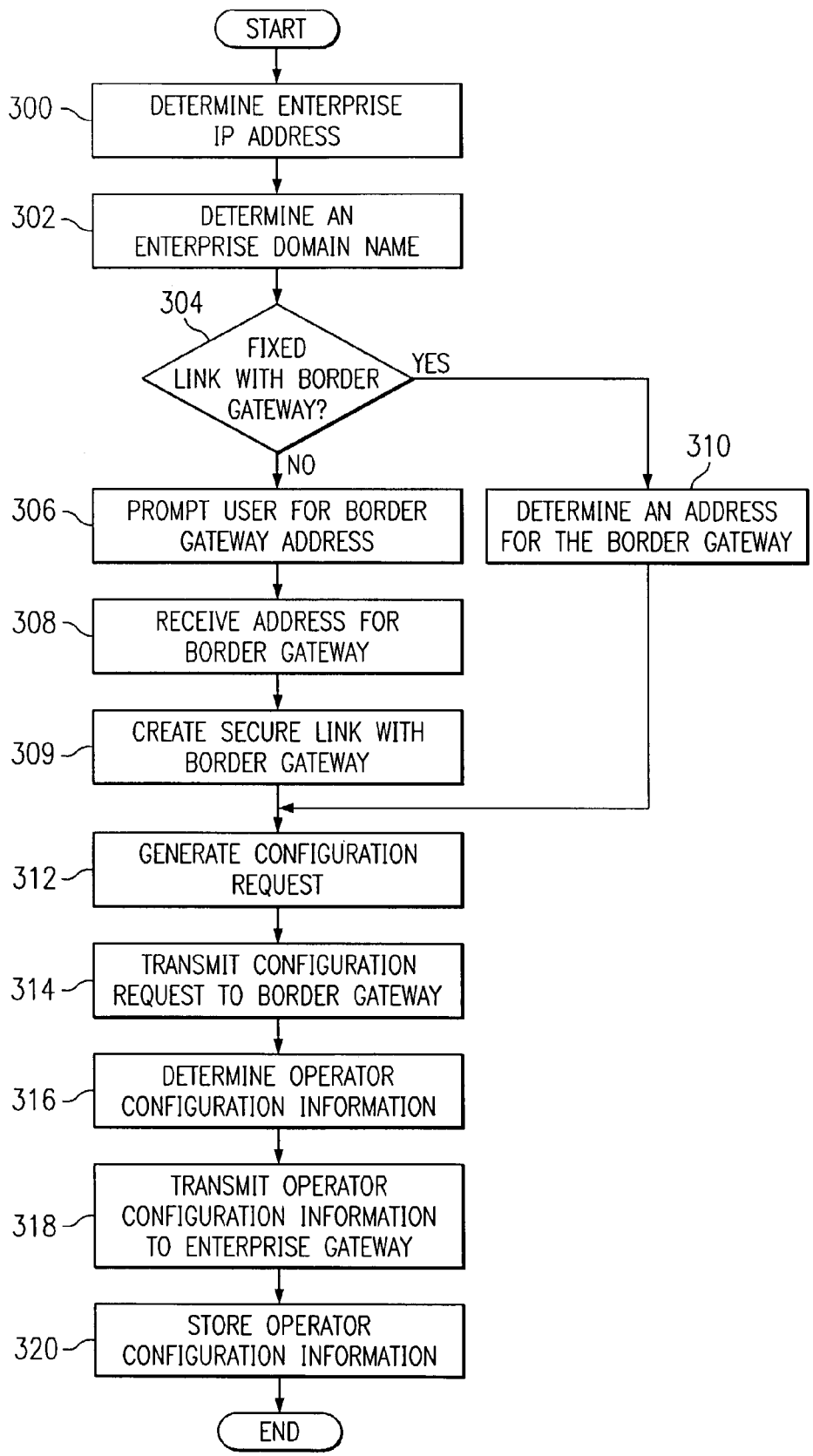

CONFIGURATION OF ENTERPRISE GATEWAYS

TECHNICAL FIELD OF THE INVENTION

This invention relates in general to telephony systems and, more particularly, to the configuration of enterprise gateways.

BACKGROUND OF THE INVENTION

As wireless devices become increasingly sophisticated, protocols and network equipment have evolved to support enhanced access, such as packet-based communications with data networks. One protocol supporting this type of access is generalized packet radio service (GPRS), which allows packet-based access to networks, such as the Internet and intranets. In GPRS systems, gateways within operator networks provide packet-based access to data networks.

SUMMARY OF THE INVENTION

In accordance with the present invention, techniques for configuring remote gateways are provided.

According to one example of the present invention, a method for configuring enterprise gateways determines an enterprise internet protocol (IP) address that identifies the interface of an enterprise gateway, with the interface linking to one or more components of an enterprise. The method determines an enterprise domain name associated with the enterprise and an address for a border gateway within an operator network. The operator network links the enterprise gateway to the one or more mobile nodes. The method communicates a configuration request to the border gateway, with the configuration request including the enterprise domain name. The method receives operator configuration information from the border gateway, with the operator configuration information including an identifier, such as an access point name assigned to the enterprise network and for use by the mobile nodes to request access to the enterprise network.

Certain embodiments of the invention may provide one or more technical advantages. These techniques permit gateway equipment and much of their functionality to reside within enterprise networks rather than operator networks. Thus, for example, gateways performing authentication of users of mobile nodes are located within the enterprise network. This centralizes management of who may access the enterprise network in the enterprise network itself. Particular embodiments can be implemented without modifying existing equipment, such as serving generalized packet radio service support nodes. Certain embodiments include volatile memory, such that enterprise gateways are periodically reconfigured with updated operator configuration information. This permits appropriate operation, but provides a degree of security for the operator configuration information.

Other technical advantages will be readily apparent to one skilled in the art from the following figures, descriptions and claims. Moreover, while specific advantages have been described above, various embodiments may include none, some, or all of the enumerated technical advantages.

BRIEF DESCRIPTION OF THE DRAWINGS

For a more complete understanding of the present invention and its advantages, reference is now made to the following description, taken in conjunction with the accompanying drawings, in which:

FIG. 4 illustrates a method for configuring an enterprise gateway linking the operator network to an enterprise network.

DETAILED DESCRIPTION OF THE INVENTION

Figure 1:
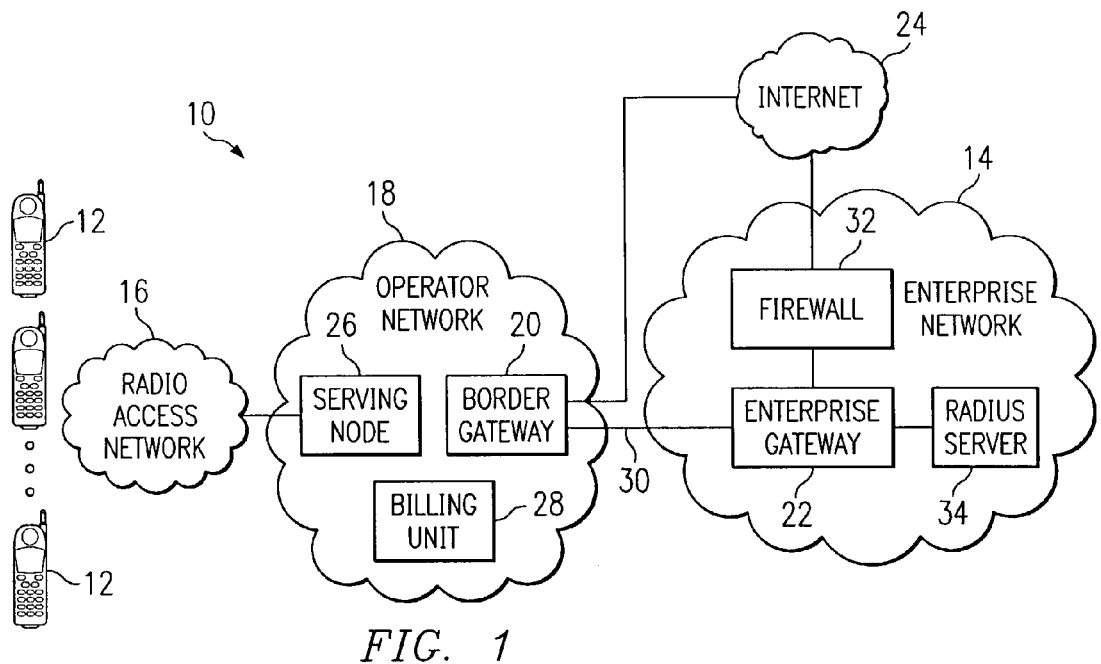
FIG. 1 illustrates a system that includes an enterprise gateway linking an operator network to an enterprise network according to particular embodiments of the present invention.

FIG. 1 illustrates a system 10 that supports wireless communication for mobile nodes 12 and provides mobile nodes 12 access to one or more enterprise networks 14. In the embodiment illustrated, system 10 includes a radio access network (RAN) 16, an operator network 18, and an enterprise network 14. Operator network 18 includes a serving node 26 that links with RAN 16 and a border gateway 20 that links with an enterprise gateway 22. Enterprise gateway 22 manages access to an enterprise network 14. During operation, enterprise gateway 22 configures to process network access requests from mobile nodes 12 by requesting operator configuration information maintained by border gateway 20. Border gateway 20 within operator network 18 retrieves the operator configuration information and communicates the operator configuration information to enterprise gateway 22.

Mobile nodes 12 support wireless communications to provide voice and/or data services. Services may include any packet-based communications. Mobile nodes 12 may comprise for example, cellular telephones, personal computers, personal digital assistants, mobile handsets, or any other devices suitable for wireless communications. Mobile nodes 12 may gain access to enterprise network 14 by generating requests identifying enterprise network 14. The requests may identify enterprise network 14 by the access point name (APN) associated with enterprise network 14. In particular embodiments, the APN is a text-based identifier that may be entered by the user of mobile node 12.

RAN 16 provides services for voice and data access to mobile nodes 12 communicating with RAN 16. According to particular embodiments, RAN 16 includes towers and other supporting equipment to facilitate communication between mobile nodes 12 and enterprise network 14. The requests for access to enterprise network 14, as generated by mobile nodes 12, may be transmitted to operator network 18 via RAN 16. Operator network 18 links RAN 16 with enterprise network 14 and other networks, such as Internet 24, to provide voice and/or data services to mobile node 12. In the illustrated embodiment, operator network 18 includes serving node 26, a border gateway 20, and a billing module 28. Operator network 18 receives the requests generated by mobile nodes 12 and processes the requests before forwarding the requests to enterprise network 14 via a fixed line 30 or indirectly through a network, such as Internet 24. Where communication between enterprise network 14 and operator network 18 is facilitated by Internet 24, a network security device, such as a firewall 32 may monitor network traffic and restrict the communication of certain types of network traffic.

Within operator network 18, serving node 26 links to RAN 16 and handles initial processing of network access requests received from mobile devices 12. For example, according to particular embodiments, operator network 18 supports GPRS protocols, and serving node 26 acts as a serving GPRS support node (SGSN). Upon receiving a network access request from one of mobile devices 12, serving node 26 processes the request and then forwards the request to an appropriate gateway linking to the requested network. For example, for a request identifying enterprise network 14, serving node 26 will process the request and then forward the request to border gateway 20.

As a part of this process, serving node 26 may reformat and/or supplement the request with additional information. For example, according to particular embodiments, serving node 26 uses the information from an access request received from mobile device 12 to generate a create packet data protocol (PDP) context request. A create PDP context request typically includes information element (IE) fields such as an APN information element and a protocol configuration option (PCO) information element. Regardless of the exact format, the network access request generated by serving node 26 includes the access point name and other information, such as a user identifier, password, and other data received from mobile device 12. After performing appropriate formatting or processing of the information from mobile device 12, serving node 26 forwards the network access request to the appropriate gateway.

Border gateway 20 provides a link between operator network 18 and enterprise network 14 by coupling to enterprise gateway 22. According to particular embodiments, border gateway 20 uses proxy protocols to enable enterprise gateway 22 to function as if it were within operator network 18. For example, using GPRS proxy protocols, border gateway 20 can receive and then forward network access requests and other appropriate information to enterprise gateway 22. Moreover, border gateway 20 can form part of a link between enterprise gateway 22 and serving node 26 that transports packets communicated between mobile nodes 12 and enterprise network 14. For example, this link may include any number of tunnels formed between enterprise gateway 22 and serving node 26 for the transport of packets. In addition, border gateway 20 monitors traffic on the link between enterprise gateway 22 and serving node 26. Border gateway 20 may report characteristics of this traffic to billing module 28 to enable appropriate billing of various entities, such as mobile nodes 12 and enterprise network 14.

Billing module 28 communicates with border gateway 20 and includes any computing device or system that receives, stores, and processes billing information. The billing information maintained by billing module 28 may be based on any appropriate metrics, such as quantity measurement and time measurements. Moreover, this information includes data identifying entities, either individually or in the aggregate, to enable suitable billing, including both calling-party and called-party billing. In particular embodiments, billing information includes aggregate information for data communications between authorized mobile nodes 12 and enterprise network 14. This enables billing based on total usage for access of authorized users.

Enterprise network 14 and Internet 24 include any collection or arrangement of elements providing voice and/or data services to mobile nodes 12. According to the illustrated embodiment, enterprise network 14 includes enterprise gateway 22 and a radius server 34. In coordination with border gateway 20, enterprise gateway 22 serves as an access point permitting mobile nodes 12 to access data services provided by enterprise network 14. For this operation, enterprise gateway 22 uses configuration information established by operator network 18. Thus, enterprise gateway 20 requests operator configuration information from border gateway 20. With this and other appropriate information, enterprise gateway 22 terminates the mobile portion of calls established by mobile nodes 12. For example, enterprise gateway 22 handles roaming, handoffs, and other features such that other elements of enterprise network 14 may be unaware of the mobile nature of the communications. In particular embodiments, enterprise gateway 22 may support GPRS protocols. As such, enterprise gateway 22 may provide some or all services of a gateway GPRS node. To perform authentication of mobile nodes 12 accessing enterprise network 14, enterprise gateway 22 communicates with radius server 34 to verify that users of mobile nodes 12 have authority to obtain access to the enterprise network 14. Radius server 34 may include any computing device or data storage system that contains the programs and files for performing authorization and/or authentication of users.

In operation, enterprise gateway 22 works with border gateway 20 to support access of mobile nodes 12 to elements within enterprise network 14. Enterprise gateway 22 determines an enterprise IP address associated with enterprise gateway 22. Enterprise gateway 22 also determines an enterprise domain name that identifies the IP domain of enterprise gateway 22. In a particular embodiment, the determination of the enterprise IP address and enterprise domain name is made by accessing preconfigured enterprise information. Enterprise gateway 22 also determines an address for border gateway 20 of operator network 18 and generates a configuration request that comprises the enterprise domain name. In particular embodiments, enterprise gateway 22 may communicate with border gateway 20 over secure fixed line 30. Determining the address for border gateway 20 may include transmitting a message directly to border gateway 20 using fixed line 30 to request the address from the border gateway 20.

In other embodiments, enterprise gateway 22 may communicate with border gateway 20 over a public network, such as Internet 24. To determine the address of border gateway 20, enterprise gateway 22 may access a domain name server to request the address of border gateway 20. Alternatively, the address of border gateway 20 may be determined by prompting a user to input the address into a computing device linking to or communicating with enterprise gateway 22. Upon determining the address of border gateway 20, the configuration request is communicated to border gateway 20 of operator network 18. The configuration request may be communicated over fixed line 30, Internet 24, or another appropriate network linking enterprise gateway 22 and border gateway 20. Where the configuration request is communicated over the Internet 24, a secure link may be established between the enterprise gateway 22 and border gateway 20. For example, an IP secure tunnel may be established between enterprise gateway 22 and border gateway 20 to ensure that the configuration request and other communications are not intercepted by or accessible to unauthorized networks or users.

Upon receiving the configuration request, border gateway 20 determines operator configuration information and responds by communicating the operator configuration information to enterprise gateway 22. In particular embodiments, operator configuration information may include the APN identifying enterprise network 14 and an IP address of enterprise gateway 22. As will be described in greater detail with regard to FIG. 2, border gateway 20 may determine operator configuration information associated with the enterprise domain name or other information identifying enterprise gateway 22 in the configuration request by accessing a memory maintained by border gateway 20. Border gateway 22 responds to the configuration request by transmitting the operator configuration information to enterprise gateway 22 over fixed line 30, Internet 24, or other suitable link.

As will be described in greater detail with regard to FIG. 3, enterprise gateway 22 stores received operator configuration information in a memory maintained by enterprise gateway 22. In this manner, enterprise gateway 22 is configured to provide data services as requested by mobile nodes 12. After configuration of enterprise gateway 22, mobile nodes 12 may access enterprise network 14 using the APN assigned to enterprise gateway 22. For example, a user of mobile node 12 may input the APN identifying enterprise gateway 22. Mobile node 12 then generates a network access request that includes the APN and communicates the network access request to operator network 18 over RAN 16. Upon receiving the network access request, operator network 18 performs initial processing of the request and determines that enterprise gateway 22 is configured to provide access to enterprise network 14. Thus, operator network 18 transmits the network access request to enterprise gateway 22. In response to the request, enterprise gateway 22 and serving node 26 may form a communication channel or tunnel for transporting packets communicated between mobile node 12 and one or more elements within enterprise network 14.

In particular embodiments, enterprise gateway 22 performs authentication prior to establishing the communication channel. Authentication enables enterprise gateway 22 to verify the right of a user of mobile node 12 to access enterprise network 14. At some point before a communication channel is established or before data communications are transmitted to mobile node 12, the user may be required to manually or verbally input into mobile node 12 a user identifier and password. In the illustrated embodiment, enterprise gateway communicates the user identifier, password, and other appropriate authentication information to radius server 34 to verify the right of the user to receive data communications from enterprise network 14 and the extent to which the user may access data stored in enterprise network 14. Upon receiving verification, enterprise gateway 22 enables mobile node 12 to access enterprise network 14. To provide this access, enterprise gateway 22 may establish a communication channel or tunnel with serving node 26 through border gateway 20. For example, enterprise gateway 22 and serving node 26 may form a GPRS tunneling protocol (GTP) tunnel that passes through border gateway 20.

Figure 2:
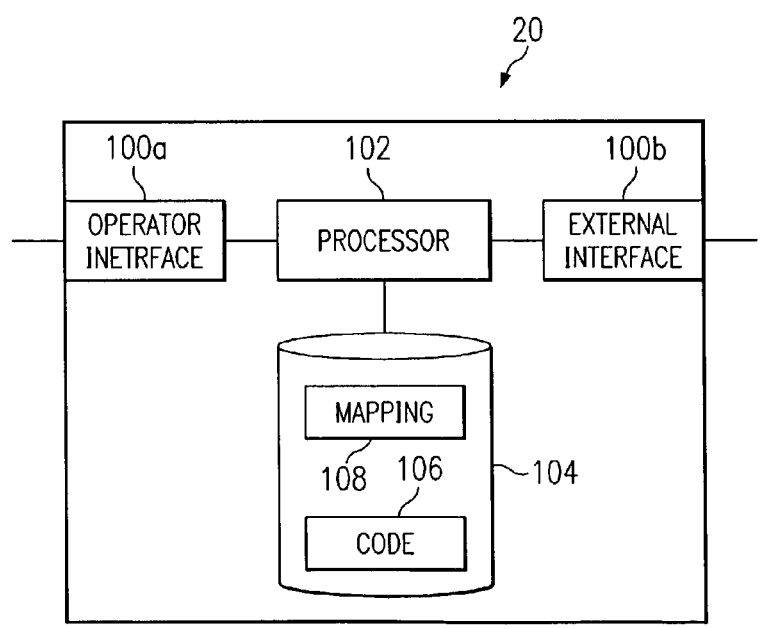
FIG. 2 illustrates a particular embodiment of a border gateway from the system.

FIG. 2 illustrates a particular embodiment of a border gateway 20 from system 10. In the embodiment illustrated, border gateway 20 includes one or more interfaces 100, a processor 102, and a memory 104. During operation, border gateway 20 works with enterprise gateway 22 to support access of mobile nodes 12 to elements within enterprise network 14. Border gateway 20 receives a configuration request from remote enterprise gateway 22 and responds with operator configuration information. Additionally, border gateway 20 of operator network 18 receives network access requests generated at mobile nodes 12 and forwards the network access requests to a pre-configured enterprise gateway 22. Border gateway 20 may use proxy protocols such that other elements of operator network 18 are unaware of the separation of functionality between border gateway 20 and enterprise gateway 22. For example, border gateway 20 may act as a proxy for enterprise gateway 22 within operator network 18 to support functions such as billing and tunneling.

Border gateway 20 includes at least one interface 100 for communicating with other elements of system 10. Although a single interface 100 may communicate with multiple elements, border gateway 20 may include multiple interfaces 100 and each interface 100 may communicate with specific elements of system 10. In the illustrated embodiment, border gateway 20 includes an operator interface 100a for communications with other elements of operator network 18. Operator interface 100a links border gateway 20 with serving node 26, billing module 28, and other elements in operator network 18. For example, operator interface 100a may receive network access requests, as generated by mobile nodes 12 and forwarded by serving node 26. Operator interface 100a may also communicate billing information to and from billing module 28. An external interface 100b links the border gateway 20 to the enterprise gateway 22 and other elements external to operator network 18. For example, external interface 100b may receive configuration requests from enterprise gateway 22. Additionally, external interface 100b may transmit network access requests, as received from serving node 26, to enterprise gateway 22. Together, external interface 100b and operator interface 100a support links between serving node 26 and enterprise gateway 22.

Processor 102 controls the management and operation of border gateway 20 by accessing information stored in memory 104 and using interfaces 100 to communicate with other elements inside and outside of operator network 18. In particular embodiments, processor 102 receives and processes configuration requests from enterprise gateway 22. Processor 102 also receives network access requests, as generated by mobile nodes 12, and forwards the network access requests to enterprise gateway 22. Memory 104 includes information for use during the operation of border gateway 20, such as for processing configuration requests from enterprise gateway 22. In the illustrated embodiment, memory 104 stores code information 106 and mapping information 108. Code information 106 includes logic that enables processor 102 to perform functions such as determining operator configuration information and the IP address of enterprise gateway 22. Code information 106 also enables processor 102 to process network access requests generated by mobile nodes 12. Mapping information 110 maps operator configuration information to enterprise domain names identifying various enterprise gateways. For example, mapping information 110 may include an entry associating particular configuration information with an enterprise domain name assigned to enterprise network 14.

In operation, border gateway 20 supports the configuration of enterprise gateway 22 by responding to configuration requests. Using external interface 100b, border gateway 20 receives a configuration request from enterprise gateway 22. The configuration request identifies the enterprise domain name associated with enterprise gateway 22 and any other information suitable for identifying and/or verifying enterprise gateway 22 and enterprise network 14. Upon receiving the configuration request, processor 102 accesses configuration information stored in memory 104. In particular embodiments, determining operator configuration information includes accessing mapping information 108 in memory 104. Mapping information 108 maps the enterprise domain name for one or more enterprise gateways 22 to operator configuration information associated with each enterprise gateway 22.

After receiving the configuration request, processor 102 determines whether memory 104 includes operator configuration information associated with the enterprise domain name identified in the configuration request. In particular embodiments, operator configuration information includes an APN assigned to enterprise network 14. The operator configuration information may also include an IP address for assignment to enterprise gateway 22, which operator network 18 may use for later communications with enterprise gateway 22. Processor 102 communicates the stored operator configuration information to enterprise gateway 22 to facilitate the configuration of enterprise gateway 22. Configuration of enterprise network 14 allows mobile node 12 accessibility to services provided by enterprise network 14.

Once configured, mobile nodes 12 access enterprise network 14 by generating network access requests that identify the APN associated with enterprise network 14 as well as any other information for processing the network access request. Border gateway 20 supports this access by acting as a proxy within operator network 18 for enterprise gateway 22. That is, border gateway 20 receives network access requests identifying the APN of enterprise network 14 and forwards these requests to enterprise gateway 22. If the request is appropriately verified by enterprise gateway 22, border gateway 20 may further serve as an intermediary for a communication channel formed between enterprise gateway 22 and serving node 26.

Border gateway 20 also supports billing features to enable operator network 18 to reconcile accounts for mobile nodes 12 and enterprise network 14. To support these billing features, border gateway 20 may use proxy commands to act in the place of enterprise gateway 22.

While the embodiment illustrated and the preceding description focus on a particular embodiment of border gateway 20 that includes specific elements, system 10 contemplates border gateway 20 having any suitable combination and arrangement of elements for linking operator network 18 to enterprise gateways 22. Therefore, the modules and functionalities described may be combined, separated, or otherwise distributed among any suitable functional components, and some or all of the functionalities of border gateway 20 may be implemented by logic encoded in media, such as software and programmed logic devices.

Figure 3:
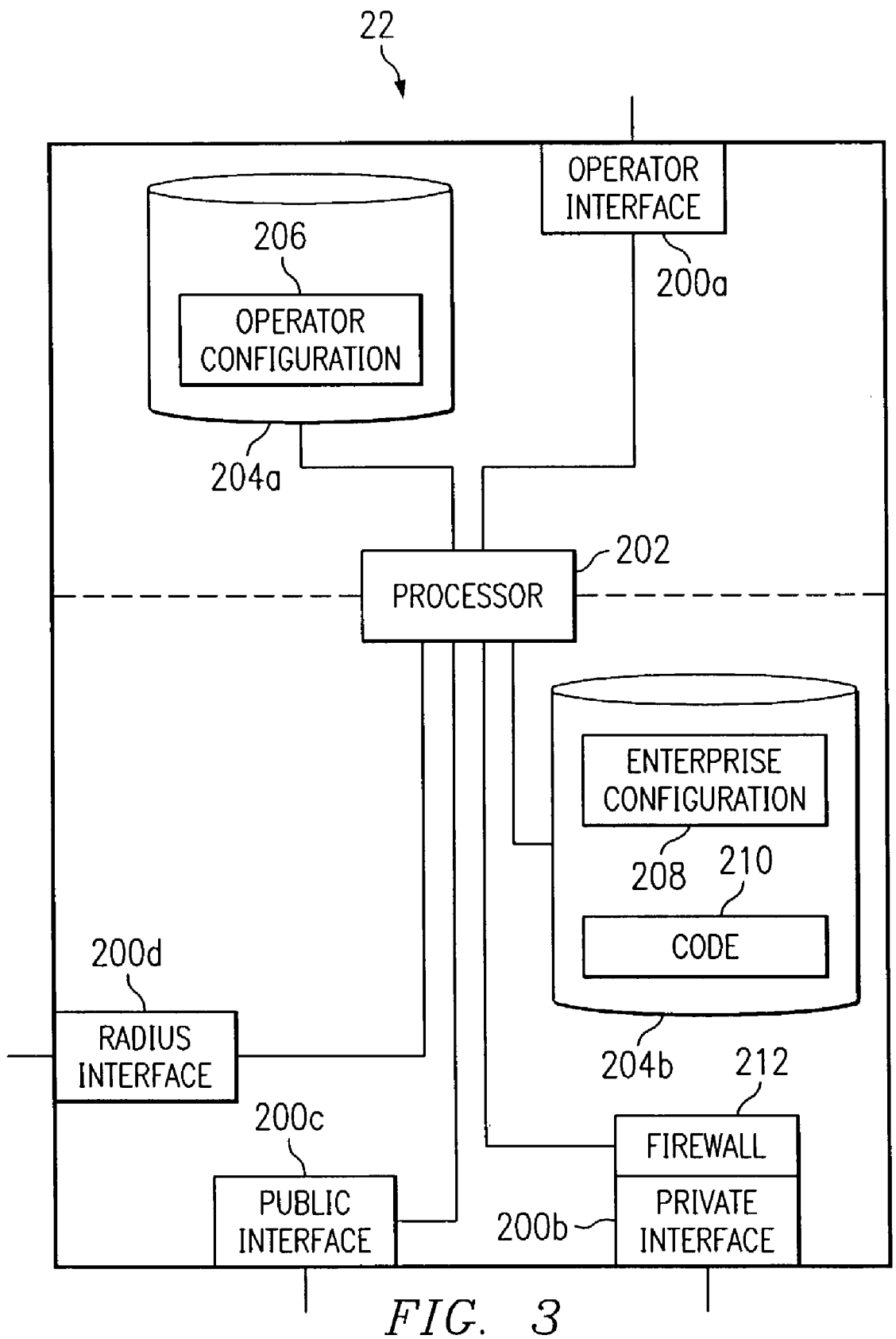
FIG. 3 illustrates a particular embodiment of an enterprise gateway from the system.

FIG. 3 illustrates a particular embodiment of an enterprise gateway 22 from system 10. In the embodiment illustrated, enterprise gateway 22 includes one or more interfaces 200, a processor 202, and one or more memories 204. During operation, enterprise gateway 22 is configured to support access of mobile nodes 12 to services provided by enterprise network 14. For example, enterprise gateway 22 may transmit configuration requests to border gateway 20 via fixed line 30 or Internet 24 and receive operator configuration information in response. Additionally, enterprise gateway 22 supports access of mobile nodes 12 to enterprise network 14 through actions such as authentication prior to establishing a communications with mobile node 12.

Enterprise gateway 22 includes at least one interface 200 for receiving and transmitting data packets to other elements of system 10. Although a single interface 200 may communicate with multiple elements, enterprise gateway 22 may include multiple interfaces 200 and each interface 200 may communicate with a specific element or elements of system 10. In the illustrated embodiment, enterprise gateway 22 includes an operator interface 200a that links the enterprise gateway 22 to the border gateway 20 of operator network 18. In various embodiments, operator interface 200a is communicates configuration requests to border gateway 20. Additionally, operator interface 200a may receive network access requests, as generated by mobile nodes 12 and forwarded from border gateway 20 to enterprise network 14. A external interface 200b and a public interface 200c links enterprise gateway 22 to mobile nodes 12 and other computing devices seeking access to enterprise network 14. A radius interface 200d links enterprise gateway 22 with radius server 34 within the enterprise network 22. Radius interface 200d may transmit mobile node information or user information to radius server 34. Additionally, radius interface 200d may receive authentication information from radius server 34. Although any suitable and appropriate interface protocol may be used, interfaces 200 may support data communications between mobile node 12 and enterprise network 14 using GPRS where appropriate.

Processor 202 controls the management and operation of enterprise gateway 22 by accessing information stored in memories 204 and using interfaces 200 to communicate with other elements inside and outside of enterprise network 14. Processor 202 supports configuration of enterprise gateway 22 through communications with border gateway 20 and further supports access of mobile nodes 12 to enterprise network 14 once configured. For example, to support configuration, processor 202 generates and transmits configuration requests to border gateway 20. Once configured, processor 202 receives network access requests, as generated by mobile nodes 12 and forwarded to enterprise gateway 22. In the illustrated embodiment, processor 202 communicates with memories 204a and 204b. Memories 204a and 204b include information to facilitate the configuring of enterprise gateway 22 and the processing of network access requests from mobile nodes 12, respectively. In particular embodiments, enterprise gateway 22 includes a volatile memory 204a that stores operator configuration information 206 as received from border gateway 20 in response to a configuration request. Such operator configuration information 206 may include the APN and/or IP address of the enterprise gateway 22, mobile node identifiers, and other information to support termination of mobile communication sessions. To protect operator network information, enterprise gateway 22 may be required to generate new configuration requests at each startup. Enterprise gateway 22 may also include a non-volatile memory 204b that stores enterprise configuration information 208 and mapping information 210. Enterprise configuration information 208 includes the enterprise domain name, the IP addresses of enterprise interfaces, the IP address of the radius server 34, the IP address of border gateway 22, and other startup information. The information stored in non-volatile memory 202b enables processor 202 to handle network access requests generated by mobile nodes 12.

In operation, processor 202 determines an enterprise IP address and enterprise domain name associated with enterprise gateway 22. In particular embodiments, enterprise gateway 22 determines the enterprise IP address and domain name by accessing preconfigured enterprise information stored in non-volatile memory 202b. Enterprise gateway 22 then determines an address for border gateway 20 of operator network 18 and generates a configuration request that includes the enterprise domain name. The manner in which the address of border gateway 20 is determined may be related to the type of link between enterprise gateway 22 and border gateway 20. If, for example, operator interface 200a is configured to send and receive data communications to and from border gateway 20 using fixed line 30, enterprise gateway 22 determines an address for border gateway 20 by transmitting a message directly to border gateway 20 to request the border gateway's address.

As another example, however, operator interface 200a may be configured to send and receive data communications to and from border gateway 20 using a public network, such as Internet 24. If sending and receiving data communications over a public network, enterprise network 14 may establish a secure link with border gateway 20. The secure link may include any appropriate IP security protocol, such as IP sec. To determine the address of border gateway 20, enterprise gateway 22 may access a domain name server (not shown) that maintains a domain name database. Enterprise gateway 22 then uses this address to access border gateway 20. In other embodiments, enterprise gateway 22 determines the address of border gateway 20 by prompting a user to input the address of border gateway 20 into an administrative interface or other appropriate device linking to or otherwise communicating with enterprise gateway 22.

Enterprise gateway 22 populates the configuration request using the enterprise domain name associated with enterprise gateway 22 and any other information associated with enterprise network 14 to facilitate the determination by border gateway 20 of operator configuration information. After processor 202 generates the configuration request, the configuration request is transmitted to border gateway 20 through operator interface 200a. As previously described, border gateway 20 may maintain mapping information 108 that enables border gateway 20 to determine operator configuration information associated with the enterprise domain name included in the configuration request. Enterprise gateway 22 receives the operator configuration information from border gateway 20 through operator interface 200a.

After receiving the operator configuration information, processor 202 stores the information in memory 204a. Where memory 204a includes volatile memory, operator configuration information stored in enterprise gateway 22, may be erased, such as when enterprise gateway 22 is powered off. Thus, enterprise gateway 22 generates configuration requests to receive updated operator configuration information each time it is reset or started up. In this manner, enterprise gateway 22 is periodically reconfigured. Processor 202 may reconfigure enterprise gateway 22 at designated time intervals and/or after a power outage or other disconnection of power to enterprise gateway 22 and any supporting computing equipment. After configuration, enterprise gateway 22 supports data services for mobile nodes 12 in response to network access requests forwarded by border gateway 20.

A configured enterprise gateway 22 receives a network access request generated at mobile node 12 and forwarded to enterprise gateway 22 by operator network 18 through interface 200a. The network access request may be communicated to enterprise gateway 22 over fixed link 30, Internet 24, or any other suitable public network. In particular embodiments, processor 202 performs authentication prior to enabling access for mobile node 12. The network access request generated by mobile node 12 may designate the authentication technique to be used by enterprise processor 202. For example, the authentication technique may specify login and password dialog, challenge and response, messaging support, and depending on the security protocol utilized, encryption. Authentication enables processor 202 to identify the user of mobile node 12 before allowing the user to access services of enterprise network 14. Where a user has manually, verbally, or otherwise input a user identifier and/or password into mobile node 12, processor 202 may communicate the user identifier and/or password to radius server 34 to verify what services the user has the authority to access within enterprise network 14. If, for example, the user is an employee, the user may be given access to more or different information in enterprise network 14 than a non-employee seeking access to enterprise network 14. According to one embodiment, the result of authentication performed by processor 202 and radius server 34 determines the interface with which the tunnel or channel links to enterprise network 14. For example, a user of a mobile node 12 who is an employee or other person authorized to access information on enterprise network 14 that is not available to the general public may communicate with enterprise gateway 22 through a external interface 200b. A network security device, such as firewall 212 monitors network traffic through external interface 200b and restricts the communication of certain types of network traffic. On the other hand, the general public may also be given access to information in enterprise network 14. Such access may be limited or different, however, than that for an employee or otherwise authorized user. Further, a tunnel established with a mobile node 12 or other computing device, which is used by a member of the general public to access information on enterprise network 14, may communicate with enterprise gateway 22 through a public interface 200c.

Upon receiving verification of the user's authority to access information in enterprise network 14, processor 202 enables access of mobile node 12 to enterprise network 14. For example, enterprise gateway 22 may establish a communication channel through border gateway 20 to serving node 26. Where serving node 26 and gateway 20 support communication using GPRS protocols, the communication channel is a GTP tunnel providing a secure, temporary path between serving node 26 and enterprise gateway 22. Alternatively, any other suitable tunneling protocols, such as IP Security, Layer 2 Tunneling Protocol, Point-to-Point Tunneling Protocol, and SOCKSv5, may be used.

While the embodiment illustrated and the preceding description focus on a particular embodiment of enterprise gateway 22 that includes specific elements, system 10 contemplates enterprise gateway 22 having any suitable combination and arrangement of elements for managing access of mobile nodes 12 to enterprise network 14. Therefore, the modules and functionalities described may be combined, separated, or otherwise distributed among any suitable functional components, and some or all of the functionalities of enterprise gateway 22 may be implemented by logic encoded in media, such as software and programmed logic devices.

FIG. 4 illustrates an example method for configuring enterprise gateway 22. The method begins at step 300 where enterprise gateway 22 determines an enterprise IP address associated with enterprise gateway 22. Enterprise gateway 22 also determines an enterprise domain name associated with enterprise gateway 22 at step 302. According to particular embodiments, the enterprise IP address and enterprise domain name may be determined by accessing preconfigured enterprise information, such as configuration information 208 stored within non-volatile memory 204b.

At decision step 304, enterprise gateway 22 determines whether the link between border gateway 20 and enterprise gateway 22 is a secure link. For example, enterprise gateway 22 may communicate with border gateway 20 over a secure fixed line 30. Alternatively, enterprise gateway 22 communicates with border gateway 20 over a public network, such as Internet 24. If enterprise gateway 22 determines at step 304 that the link is not secure, enterprise gateway 22 may prompt an administrator for an address for border gateway 20 at step 306. Alternatively, enterprise gateway 22 accesses a domain name server that maintains a domain name database and requests the address for border gateway 20 from the domain name server. At step 308, enterprise gateway 22 receives the address for border gateway 20 from the administrator or the domain name server. Because the link over a network such as Internet 24 may be insecure, enterprise gateway 22 may form a secure link with border gateway 20 at step 309. For example, using IP security protocols, enterprise gateway 22 may establish a IP Sec. tunnel to communicate with border gateway 20.

Returning to step 304, if enterprise gateway 22 determines that the link between enterprise gateway 22 and border gateway 20 is secure, the address may be determined by requesting the address directly from border gateway 20 using fixed line 30 at step 310. Regardless, of the method used to determine the address of border gateway 20, however, enterprise gateway 22 generates a configuration request at step 312. As previously discussed, the configuration request includes the enterprise domain name and any other appropriate information identifying enterprise gateway 22 and enterprise network 14. At step 314, enterprise gateway 22 transmits the configuration request to border gateway 20 via fixed line 30, Internet 24, or other suitable network linking enterprise gateway 22 and border gateway 22. Upon receiving the configuration request, border gateway 20 determines operator configuration information at step 316. Border gateway 20 may determine operator configuration information by accessing a database or other memory maintained by border gateway 20. In particular embodiments, border gateway 20 includes mapping information 108 that maps the enterprise domain name identifying enterprise network 14 to operator configuration information unique to enterprise network 14. According to particular embodiments, operator configuration information includes the APN identifying enterprise network 14.

At step 318, border gateway 20 transmits the operator configuration information to enterprise gateway 22. Border gateway 20 may communicate the operator configuration information to enterprise gateway 22 over fixed line 30, Internet 24, or other suitable network as appropriate. Upon receiving the operator configuration information, enterprise gateway 22 stores the operator configuration information, for example, in memory 204a, at step 320. In this manner, enterprise gateway 22 configures to provide services in response to network access requests for mobile nodes 12.

Thus, the flowchart and preceding description outline the configuration of enterprise network 14 to handle network access requests. However, the flowchart and accompanying description illustrate only an exemplary method of operation, and system 10 contemplates the configuration of enterprise network 14 using any suitable techniques and elements for processing network access requests. Therefore, many of the steps in this flowchart may take place simultaneously and/or in different orders that as shown. In addition, the configuration of enterprise network 14 may use methods with additional steps, fewer steps, and/or different steps, so long as the methods remain appropriate.

Although the present invention has been described with several examples, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for configuring enterprise gateways comprising:
   determining an enterprise internet protocol (IP) address that identifies an interface of an enterprise gateway within an enterprise network, the interface coupling to one or more components of the enterprise network;
   determining an enterprise domain name associated with the enterprise network;
   determining an address for a border gateway within an operator network, the operator network linking the enterprise gateway to one or more mobile nodes;
   communicating a configuration request to the border gateway, the configuration request comprising the enterprise domain name; and
   receiving operator configuration information from the border gateway, the operator configuration information comprising an access point name assigned to the enterprise network and for use by the mobile nodes to request access to the enterprise network.

2. The method of claim 1, wherein the operator configuration information further comprises an administrative internet protocol (IP) address to which the operator network may transmit packets for receipt by the enterprise gateway, the method further comprising configuring a second interface of the enterprise gateway to receive packets address to the administrative IP address.

3. The method of claim 1, further comprising:
   coupling the enterprise gateway to the border gateway with a fixed link; and
   determining the address for the border gateway by communicating an address request on the fixed link and receiving the address from the border on the fixed link in response to the request.

4. The method of claim 1, further comprising:
   coupling the enterprise gateway to the border gateway using a public network;
   determining an internet protocol (IP) address for the border gateway;
   establishing a secure link across the public network between the enterprise gateway and the border gateway; and
   communicating the configuration request to the border gateway using the secure link.

5. The method of claim 4, wherein determining the IP address for the border gateway comprises prompting a user to input an identifier for the border gateway, wherein the identifier is either an internet domain name for the border gateway.

6. The method of claim 1, further comprising:
   receiving a network access request from the border gateway, the network access request generated by a serving node to request access for a mobile node to services of the enterprise network, the network access request comprising an identifier for the mobile node, the access point name, a user identifier, and a password;
   determine authorization of the network access request using the user identifier and the password; and
   establishing a communication channel through the border gateway to the serving node if the network access request is authenticated, the communication channel for the transport of packets between the mobile node and the enterprise network.

7. The method of claim 1 further comprising maintaining the operator configuration information received from the border gateway in a volatile memory.

8. A method for configuring an enterprise gateway comprising:
   receiving, at a border gateway within an operator network, a configuration request from an enterprise gateway within an enterprise network, the configuration request comprising an enterprise domain name associated with the enterprise network, the operator network connecting the enterprise gateway to one or more mobile nodes;
   determining operator configuration information associated with the enterprise domain name in the configuration request; and
   communicating the operator configuration information to the enterprise gateway, the operator configuration information comprising an access point name assigned to the enterprise network and for use by the mobile nodes to request access to the enterprise network.

9. The method of claim 8, wherein the operator configuration information further comprises an administrative internet protocol (IP) address to which an operator network may transmit packets for receipt by the enterprise gateway.

10. The method of claim 8, wherein determining operator configuration information comprises:

maintaining mapping information in the memory, the mapping information mapping the enterprise domain name for one more enterprise gateways to operator configuration information associated with each enterprise gateway; and determining whether the memory includes mapping information associated with the enterprise domain name include in the configuration request.

11. The method of claim 8, further comprising:

receiving a request for data communications from a mobile node communicating with an operator network, the request for data communications comprising a request for data from the enterprise network;

determining an enterprise gateway configured to provide access to the enterprise network; and forwarding the request to the IP address of the enterprise gateway.

12. The method of claim 11, further comprising:

maintaining usage information tracking communications between the mobile nodes and the enterprise gateway; and communicating the usage information to a billing module.

13. An enterprise gateway for communicating data communications between a mobile node and an enterprise network comprising:

a processor operable to:
determine an enterprise internet protocol (IP) address that identifies an interface of an enterprise gateway of an enterprise network;
determine an address for a border gateway within an operator network, the operator network linking the enterprise gateway and one or more mobile nodes;
determine an enterprise domain name associated with the enterprise network; and
generate a configuration request that comprises the enterprise domain name; and a first interface of the enterprise gateway, the first interface coupling to one or more components of the enterprise network and operable to;
transmit the configuration request to the border gateway, the configuration request comprising the enterprise domain name; and
receive operator configuration information from the border gateway, the operator configuration information comprising an access point name assigned to the enterprise network and for use by the mobile nodes to request access to the enterprise network.

14. The enterprise gateway of claim 13, wherein the operator configuration information further comprises an administrative internet protocol (IP) address to which the operator network may transmit packets for receipt by the enterprise gateway, and the enterprise gateway further comprises a second interface configured to receive packets addressed to the administrative IP address.

15. The enterprise gateway of claim 13, wherein the first interface is further operable to:

couple the enterprise gateway to the border gateway using a fixed link; and communicate an address request on the fixed link to determine the address for the border gateway by communicating and receiving the address from the border gateway on the fixed link in response to the request.

16. The enterprise gateway of claim 13, wherein the first interface is further operable to:

couple the enterprise gateway to the border gateway using a public network; and communicate the configuration request to the border gateway over a secure link across the public network between the enterprise gateway and the border gateway.

17. The enterprise gateway of claim 16, wherein the processor is further operable to prompt a user to input an identifier for the border gateway, wherein the identifier is either an internet domain name or the IP address for the border gateway.

18. The enterprise gateway of claim 13, wherein the first interface is further operable to receive a network access request from the border gateway, the network access request being generated by a serving node to request access for a mobile node to services of the enterprise network, the network access request comprising an identifier for the mobile node, the access point name, a user identifier, and a password.

19. The enterprise gateway of claim 18, wherein the processor is further operable to establish a communication channel through the border gateway to the serving node if the network access request is authorized, the communication channel for the transport of packets between the mobile node and the enterprise network.

20. The enterprise gateway of claim 13, wherein the processor is further operable to maintain the operator configuration information received from the border gateway in a volatile memory.

21. A border gateway for communicating data communications between a mobile node and an enterprise network comprising:

a first interface in an operator network operable to receive a configuration request from an enterprise gateway within an enterprise network, the configuration request comprising an enterprise domain name associated with the enterprise network, the operator network connecting the enterprise gateway to one or more mobile nodes;

a processor operable to:
determine operator configuration information associated with the enterprise domain name included in the configuration request the operator configuration information comprising an access point name assigned to the enterprise network and for use by one or more mobile nodes to request access to the enterprise network; and
communicate the operator configuration information to the enterprise gateway trough the first interface.

22. The border gateway of claim 21, wherein the operator configuration information further comprises an administrative internet protocol (IP) address to which the operator network may transmit packets for receipt by the enterprise gateway.

23. The border gateway of claim 21, wherein the processor is further operable to:

maintain mapping information in the memory, the mapping information mapping the enterprise domain name for one more enterprise gateways to operator configuration information associated with each enterprise gateway; and determine whether the memory includes mapping information associated with the enterprise domain name included in the configuration request.

24. The border gateway of claim 21, wherein the processor is further operable to:

receive requests for data communications from a mobile node communicating with an operator network, the request for data communications comprising a request for data from the enterprise network;

determine that the enterprise gateway is configured to provide access to the enterprise network; and forward the request to the IP address of the enterprise gateway.

25. The border gateway of claim 24, wherein the processor is further operable to:
maintain usage information tracking communications between the mobile nodes and the enterprise gateway; and
communicate the usage information to a billing module.

26. A computer-readable medium encoded with computer executable instructions for configuring enterprise gateways, the computer executable instructions operable to cause the computer to perform the steps:
determine an enterprise internet protocol (IP) address that identifies an interface of an enterprise gateway within an enterprise network, the interface coupling to one or more components of the enterprise network;
determine an enterprise domain name associated with the enterprise network;
determine an address for a border gateway within an operator network, the operator network linking the enterprise gateway to one or more mobile nodes;
communicate a configuration request to the border gateway, the configuration request comprising the enterprise domain name; and
receive operator configuration information from the border gateway, the operator configuration information comprising an access point name assigned to the enterprise network and for use by the mobile nodes to request access to the enterprise network.

27. The computer-readable medium of claim 26, wherein operator configuration information further comprises an administrative internet protocol (IP) address to which the operator network may transmit packets for receipt by the enterprise gateway, the logic further operable to configure a second interface of the enterprise gateway to receive packets addressed to the administrative IP address.

28. The computer-readable medium of claim 26, wherein the logic is further operable to:
couple the enterprise gateway to the border gateway using a fixed link; and
determine the address for the border gateway by communicating an address request on the fixed link and receiving the address from the border gateway on the fixed link in response to the request.

29. The computer-readable medium of claim 26, wherein the logic is further operable to:
couple the enterprise gateway to the border gateway using a public network;
determine an internet protocol (IP) address for the border gateway;
establishing a secure link across the public network between the enterprise gateway and the border gateway; and
communicating the configuration request to the border gateway using the secure link.

30. The computer-readable medium of claim 29, wherein the logic is further operable to determine the address for the border gateway by prompting a user to input an identifier for the border gateway, wherein the identifier is either an internet domain name or the IP address for the border gateway.

31. The computer-readable medium of claim 26, wherein the logic is further operable to:
receive a network access request from the border gateway, the network access request generated by a serving node to request access for a mobile node to services of the enterprise network, the network access request comprising an identifier for the mobile node, the access point name, a user identifier, and a password;
determining authorization of the network access request using the user identifier and the password; and
establishing a communication channel through the border gateway to the serving node if the network access request is authorized, the communication channel for the transport of packets between the mobile node and the enterprise network.

32. The computer-readable medium of claim 26 wherein the logic is further operable to maintain the operator configuration information received from the border gateway in a volatile memory.

33. A system for configuring enterprise gateways comprising:
means for determining an enterprise internet protocol (IP) address that identifies an interface of an enterprise gateway within an enterprise network, the interface coupling to one or more components of the enterprise network;
means for determining an enterprise domain name associated with the enterprise network;
means for determining an address for a border gateway within an operator network linking to mobile units, the border gateway communicating with the enterprise gateway;
means for communicating a configuration request to the border gateway, the configuration request comprising the enterprise domain name; and
means for receiving operator configuration information from the border gateway, the operator configuration information comprising an access point name assigned to the enterprise network and for use by the mobile nodes to request access to the enterprise network.

* * * * *